No. 651,699. Patented June 12, 1900.
T. F. CURLEY.
RAZOR GUARD.
(Application filed Dec. 22, 1899.)
(No Model.)
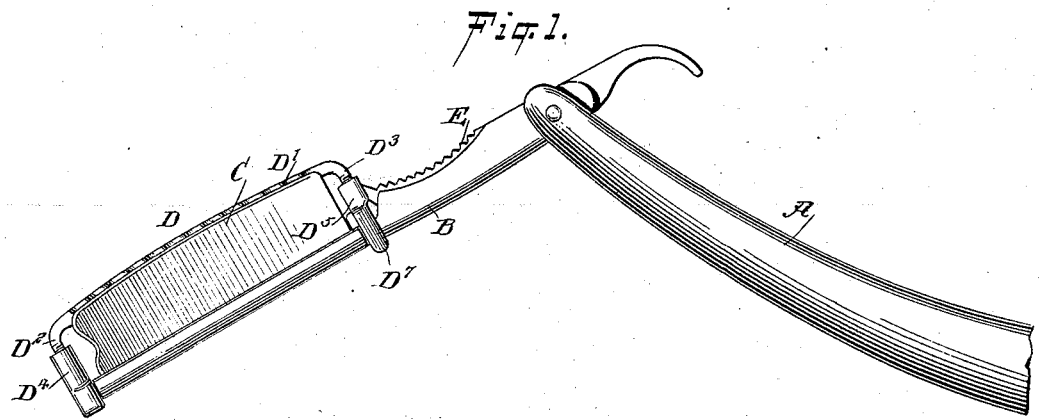
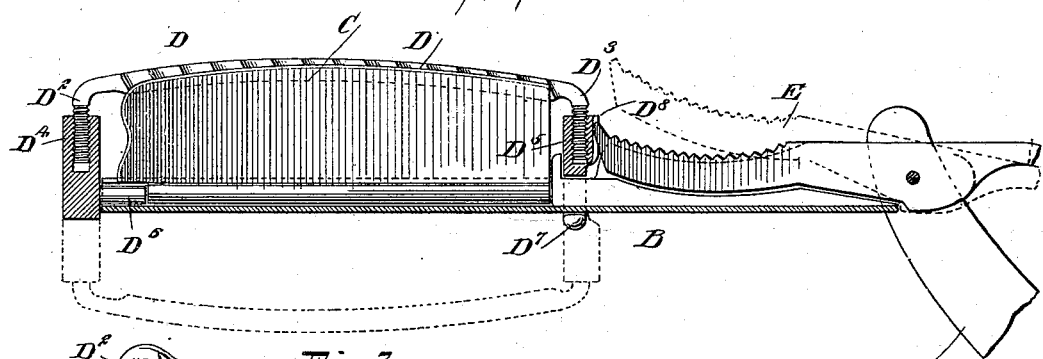
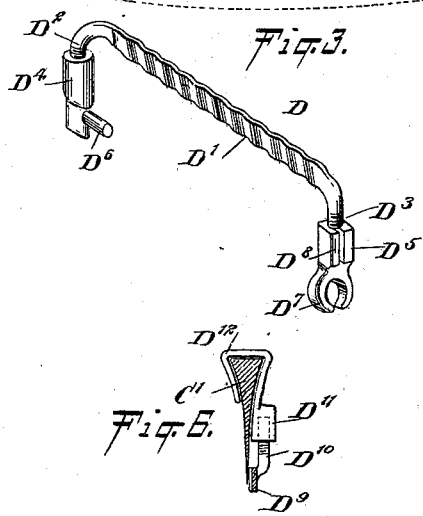
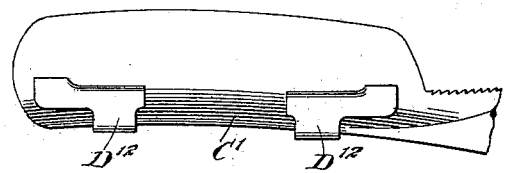
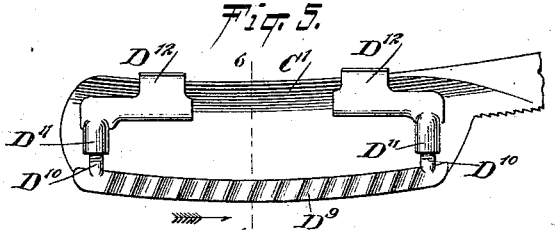
WITNESSES:
William P. Goebel
Rev. G. Hoster
INVENTOR
Terence F. Curley
BY
Munn
ATTORNEYS
THE NORRIS PETERS CO., PHOTO-LITHO., WASHINGTON, D. C.

UNITED STATES PATENT OFFICE.

TERENCE F. CURLEY, OF NEW YORK, N. Y.

RAZOR-GUARD.

SPECIFICATION forming part of Letters Patent No. 651,699, dated June 12, 1900.

Application filed December 22, 1899. Serial No. 741,282. (No model.)

*To all whom it may concern:*

Be it known that I, TERENCE F. CURLEY, a citizen of the United States, and a resident of the city of New York, borough of Brooklyn, county of Kings, and State of New York, have invented certain new and useful Improvements in Razor-Guards, of which the following is a full, clear, and exact description.

The object of the invention is to provide a new and improved razor-guard which is simple and durable in construction, readily attached to or removed from the razor, and arranged for convenient and accurate adjustment to bring the guard in proper position relatively to the edge of the blade.

The invention consists of novel features and parts and combinations of the same, as will be fully described hereinafter and then pointed out in the claims.

A practical embodiment of my invention is represented in the accompanying drawings, forming a part of this specification, in which similar characters of reference indicate corresponding parts in all the views.

Figure 1 is a side elevation of the improvement as applied to a razor having a removable blade. Fig. 2 is an enlarged sectional side elevation of the same. Fig. 3 is a perspective view of the guard detached. Fig. 4 is a rear elevation of a modified form of the improvement as applied to an ordinary razor. Fig. 5 is a front elevation of the same, and Fig. 6 is a transverse section of the same on the line 6 6 in Fig. 5.

The improved guard shown in Figs. 1 and 2 is applied to a razor such as shown and described, for instance, in Letters Patent of the United States Nos. 398,947 and 398,948, granted to Terence F. Curley and A. S. Granger on March 5, 1889. This razor is provided with a handle A, to which is pivoted a tubular back B for receiving the removable blade C, locked in position by a guard D, held against movement by a locking-arm E, pivoted on the handle A on the main pivot that carries the back B. The guard D is provided with a guard-bar D', shaped to follow the contour of the cutting edge of the blade C, and the ends of the said bar D' are formed with angular lugs $D^2$ $D^3$, having screw-threads for screwing in the nuts $D^4$ $D^5$, of which the nut $D^4$ is provided with a pin $D^6$ for insertion in the outer tubular end of the back B, as is plainly shown in Fig. 2. The other nut $D^5$ is formed with a fork $D^7$ for external engagement with the back B, and on said nut $D^5$ is also formed a slot $D^8$ for receiving the free end of the locking-arm E to hold the guard against turning on the back B, the same as described in Patent No. 398,947 above referred to. When the arm E is out of engagement with the slot $D^8$, then the guard can be swung around the back B to reverse its position relatively to the blade C, the same as described in the patent above referred to, and when it is desired to remove the blade the guard is removed first from the back by swinging it into the position shown in dotted lines in Fig. 2—that is, in a position directly opposite to the blade C. A longitudinal outward sliding of the guard D brings the pin $D^6$ out of engagement with the back, and also slides the fork $D^7$ out of engagement with the back to allow convenient removal of the blade C.

When the guard is removed from the razor, as shown in Fig. 3, then the nuts $D^4$ $D^5$ can be independently screwed on the lugs $D^2$ $D^3$, so as to bring the guard-bar D' in proper relation to the cutting edge of the blade C to insure proper shaving with the greatest safety. Thus, for instance, if one end of the guard is a little wider than the other end relatively to the cutting edge of the blade the operator by removing the guard from the razor can screw the corresponding nut farther in or out and bring the guard-bar into proper position relatively to the cutting edge of the blade. This adjustment of the guard-bar relatively to the cutting edge of the blade is very important, as in honing or grinding the blade the contour of the cutting edge changes, and consequently an adjustment of the guard-bar is necessary to again bring the guard-bar in proper relation to the cutting edge. If necessary, the outer edge of the bar D' is ground to conform to a new curvature given to the cutting edge of the blade and then the nuts are adjusted to bring the outer edge in proper position on the blade relatively to the cutting edge.

In the construction illustrated in Figs. 4, 5, and 6 the razor on which the guard is used is of ordinary construction and has a blade C′, and in this case the guard-bar D⁹ has its threaded lugs D¹⁰ engaged by nuts D¹¹, formed on spring-clips D¹², made U-shaped to clamp the back of the blade C′, as is plainly indicated in the figures referred to. It will be seen that in this construction the nuts and their clips are independently adjusted on the lugs D¹⁰, so that the bar D⁹ can be readily adjusted according to the cutting edge of the blade C, as above described relatively to Figs. 1 and 2.

Having thus fully described my invention, I claim as new and desire to secure by Letters Patent—

1. A razor-guard, comprising a guard-bar formed at its ends with threaded lugs, a separate and independent attaching device for each end of the razor each attaching device having a fixed nut formed with a threaded socket closed at its inner end for screwing on the corresponding threaded lug of the guard-bar, whereby each attaching device and its nut may be independently adjusted on the corresponding lug, substantially as shown and described.

2. A razor-guard, comprising a guard-bar formed at its ends with threaded lugs, a nut for each of said lugs having a threaded socket closed at its inner end, and a separate attaching device for each end of the razor the said attaching devices being connected with the closed ends of the respective nuts, substantially as described.

3. A razor-guard, comprising a guard-bar formed at its ends with screw-threaded lugs, nuts adapted to screw on the said lugs, the outer nut having a pin adapted to enter an opening in the outer end of the back of the razor, the inner nut being formed with a fork for engagement with the back of the razor, substantially as described.

4. A razor-guard, comprising a guard-bar having its ends formed with angular screw-threaded lugs, nuts adapted to screw on the said lugs, the outer nut having a pin adapted to enter an opening in the outer end of the back of the razor, the inner nut being formed with a fork for engagement with the back of the razor, and a fastening device for holding the guard in position, substantially as described.

5. A razor-guard, comprising a guard-bar formed at its ends with screw-threaded lugs, independent attaching devices arranged for connection with the razor and each having a fixed nut for screwing on the corresponding threaded lug, one of said attaching devices being formed with a fork for engagement with the back of the razor and also provided with a slot, and a fastening device adapted to engage said slot to hold the guard in position.

In testimony whereof I have signed my name to this specification in the presence of two subscribing witnesses.

TERENCE F. CURLEY.

Witnesses:
THEO. G. HOSTER,
EVERARD BOLTON MARSHALL.